(12) United States Patent
Duriez et al.

(10) Patent No.: US 6,656,035 B2
(45) Date of Patent: Dec. 2, 2003

(54) DEVICE FOR DIFFUSING A STREAM OF AIR INTO A PASSENGER COMPARTMENT OF A MOTOR VEHICLE

(75) Inventors: Dominique Duriez, Harnes (FR); Jean Dauvergne, Harnes (FR)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/974,765

(22) Filed: Oct. 9, 2001

(65) Prior Publication Data

US 2002/0177398 A1 Nov. 28, 2002

(30) Foreign Application Priority Data

Oct. 17, 2000 (FR) .............................................. 00 13290

(51) Int. Cl.$^7$ ................................................. B60H 1/34
(52) U.S. Cl. ....................................... 454/152; 454/158
(58) Field of Search ................................. 454/137, 152, 454/158; 55/385.2, 467.1, 473

(56) References Cited

U.S. PATENT DOCUMENTS

| | | | | |
|---|---|---|---|---|
| 2,731,104 A | * | 1/1956 | Baker et al. | ................... 55/357 |
| 3,719,134 A | * | 3/1973 | Korinth | ...................... 454/152 |
| 5,524,923 A | * | 6/1996 | Henseler | ................... 280/728.3 |
| 6,004,203 A | * | 12/1999 | Bieri | ........................... 454/152 |
| 6,468,491 B1 | * | 10/2002 | Foury et al. | ............. 423/245.1 |
| 2001/0021636 A1 | * | 9/2001 | Paumier et al. | ............. 454/152 |

* cited by examiner

*Primary Examiner*—Harold Joyce
(74) *Attorney, Agent, or Firm*—Harrison & Egbert

(57) ABSTRACT

A device for diffusing a stream of air F inside a passenger compartment, in particular that of a motor vehicle, including an air supply area, whereof at least one part of its diffusion is effected through a porous panel, constituting, in particular, at least one portion of a dashboard, a door panel or a roof, and allowing said stream of air F to flow freely simultaneously in all spatial directions, wherein a filtering member is interposed between the air supply area and the porous panel.

8 Claims, 2 Drawing Sheets

DEVICE FOR DIFFUSING A STREAM OF AIR INTO A PASSENGER COMPARTMENT OF A MOTOR VEHICLE

BACKGROUND OF THE INVENTION

1. Field of the Invention

The present invention relates to a device for diffusing a stream of air into a passenger compartment, in particular that of a motor vehicle.

However, although more especially intended for such applications, it could also be used in any other type of waterborne, air and/or land craft or vehicles, as well as for stationary installations.

2. Description of Related Art

In presently known motor vehicles, air diffusion is generally effected by devices emerging in the area of items, of trim such as, for example, dashboards, door panels or others. Such devices are constituted, in particular, by different conduits enabling a stream of air to be routed to an orifice from which said stream of air is projected into the passenger compartment through a ventilation grill, which is possibly mobile, clearly visible on the surface of said items.

The major drawback of this type of device is that the stream or streams of air emitted travel in a precise direction and thus give the occupants of the vehicle the impression of a draft which, while it may sometimes be desired, is often unpleasant and a source of discomfort when only gentle diffusion is wanted. In addition, such streams of air or drafts are not conducive to the creation of a homogeneous air environment inside the passenger compartment of the vehicle. It may further be observed that, when the air flow rate is maximal, turbulence occurs, generating acoustic discomfort; this discomfort is in addition to that originating from the fan, the noise of which is conducted without impediment via the air conduits. Furthermore, the presence of ventilation grills on the surfaces of the dashboards impairs their aesthetic appearance.

There are also known air diffusion devices including an air supply area with which at least a part of the diffusion is effected through a porous panel constituting at least one part of a dashboard, a door panel or a roof.

Such porous panels have made it possible to solve certain drawbacks associated with air diffusion, which was previously effected by devices emerging in the area of items of trim such as those aforementioned.

The use of a porous panel has likewise made it possible to overcome the drawbacks inherent in the other devices by permitting the free flow of a stream of air, with this taking place simultaneously in all directions in the space of ft passenger compartment.

However, such porous panels, while they have made it possible to overcome the aforementioned drawbacks, have a drawback linked with the actual operation of these panels, Their porosity is, in fact, low, so that particles present in the air tend to clog them, which gradually impairs their performance. What is more, as the particles, which are formed of soot and oily materials, tend to migrate through the panels towards their visible faces, this has an effect on their external appearance.

BRIEF SUMMARY OF THE INVENTION

The object of the present invention is to overcome these drawbacks and, for this purpose, provides a device for diffusing a stream of air inside a passenger compartment, in particular that of a motor vehicle, including an air supply area, whereof at least one part of its diffusion is effected through a porous panel, constituting, in particular, at least one portion of a dashboard, a door panel or a roof, and allowing said stream to flow freely simultaneously in all spatial directions, characterized in that a filtering member is interposed between the air supply area and the porous panel. Advantageously, its filtering power is equal to or greater than that of the porous panel, so as to retain all corresponding particles present in the air prior to its passing through the porous panel.

In this way, the particles are halted by the filtering member, and not by the porous panel.

Furthermore, according to another feature of the device according to the present invention, the filtering member has a surface area that is greater than that of said porous panel to increase its useful filtering surface, hence its service life.

The present invention also relates to the characteristics that will emerge in the course of the description that follows and which are to be considered in isolation or according to all possible technical combinations.

BRIEF DESCRIPTION OF THE SEVERAL VIEWS OF THE DRAWINGS

This description, given by way of a non-limitative example, will make it easier to understand how the invention can be implemented, with reference to the annexed drawings.

DETAILED DESCRIPTION OF THE INVENTION

Figure 1:
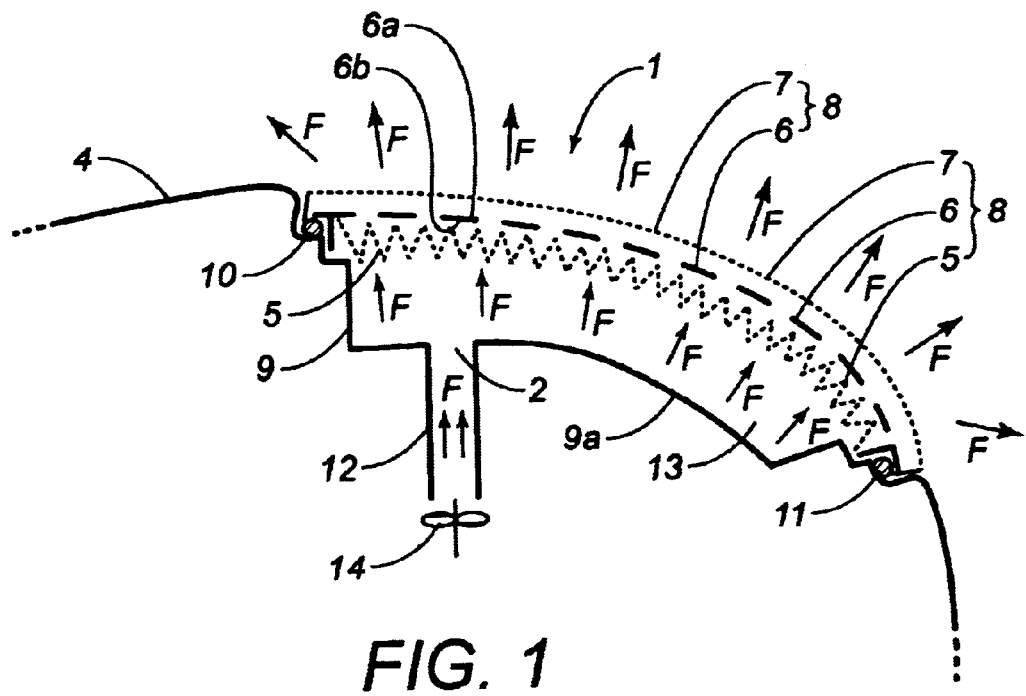
FIG. 1 is a diagrammatic cross-sectional view of a device for diffusing a stream of air according to a first exemplary embodiment.

Device 1 for diffusing a stream of air F inside a passenger compartment, shown in FIG. 1, includes an air supply area 2, whereof at least one part of its diffusion is effected through a porous panel 3 constituting, in particular, at least one portion of a dashboard 4 so as to enable said stream F to flow freely simultaneously in all spatial directions.

According to the invention, a filtering member 5 is interposed between air supply area 2 and porous panel 3.

Advantageously, the filtering power of filtering member 5 is equal to or greater than that of porous panel 3, in such a way as to retain all the corresponding particles present in the air prior to its passing through said porous panel 3.

Preferably, porous panel 3 is constituted by a grid 6, the forward portion 6a of which is covered by a porous material 7, filtering member 5 being, for its part, mounted on said porous panel 3 at the rear portion 6b of its grid 6, over the entire surface area of the latter.

With further reference to the exemplary embodiment of FIG. 1, grid 6, porous material 7 and filtering member 5 form an assembly 8 removably mounted on a fixed support 9 integral with dashboard 4, in the case in point, or with a door panel or a roof, via removable complementary means 10 and 11 for fixing said support 9 and said grid 6.

Such complementary fixing means 10 and 11 can, for example be envisaged as snap fastening systems.

According to another feature of the invention, support 9 forms a wall 9a in which emerges a ventilation conduit 12 and which defines with removable filtering assembly 8 an enclosure 13 designed to distribute the flow of air F passing through said assembly 8.

Furthermore, support 9 makes it possible to obtain continuity of appearance between dashboard 4, according to the present exemplary embodiment, and assembly 8.

Ventilation can, for example, be effected via a fan 14.

According to another feature of the invention, filtering member 5 is mounted on grid 6 of porous panel 3, removably, to enable it to be replaced independently of the latter.

Figure 2:
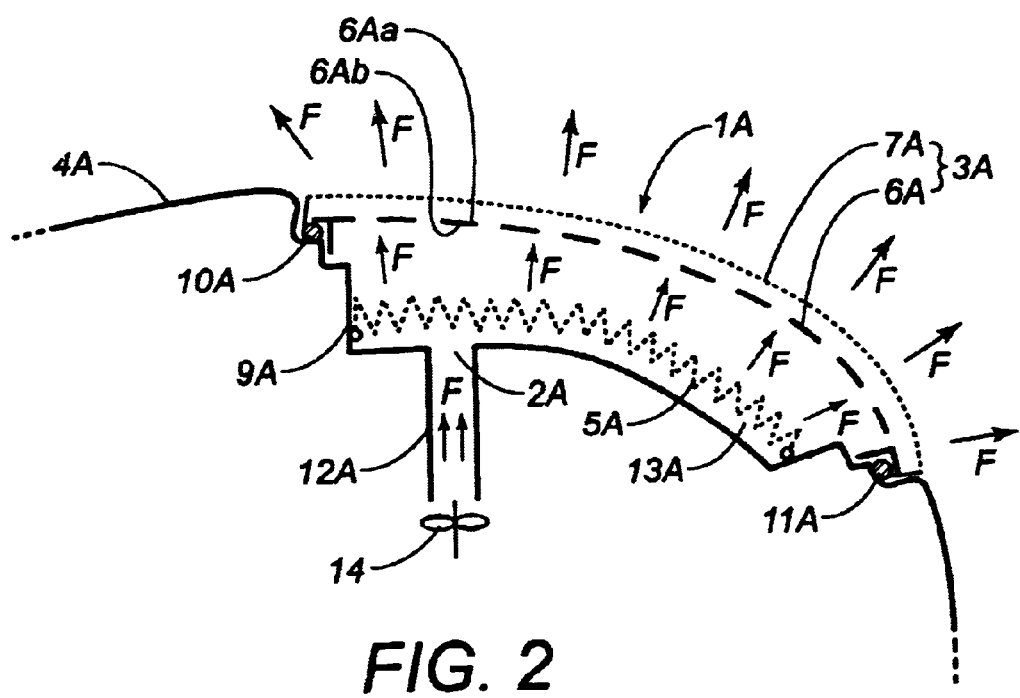
FIG. 2 is a diagrammatic cross-sectional view of a device for diffusing a stream of air according to a second exemplary embodiment of the invention.

According to a second form of embodiment, shown in FIG. 2, porous panel 3A is constituted by a grid 6A the forward portion 6Aa of which is covered bit a porous material 7A, said panel 3A being mounted removably on a fixed support 9A which is integral with dashboard 4A, according to the present exemplary embodiment, via removable complementary means 10A, 11A for fixing said support 9A and said grid 6A, Said filtering member 5A is mounted, also removably, on support 9A to enable it to be replaced independently of porous panel 3A after the latter has been removed.

As in the preceding exemplary embodiment, support 9A forms a wall in which emerges a ventilation conduit 12A and which defines with porous panel 3A an enclosure 13A designed to distribute the stream of air F passing through said panel 3A.

This being said, filtering member 5, 5A has a surface area larger than that of said porous panel 3, 3A to increase the useful filtering surface of said device.

In a manner common to the two exemplary embodiments of FIGS. 1 and 2, filtering member 5, 5A is constituted by a sheet forming concertina type folds, in a manner known per se, enabling an effective surface area to be obtained that is, for example, 3 to 10 times greater than the frontal surface.

Figure 3:
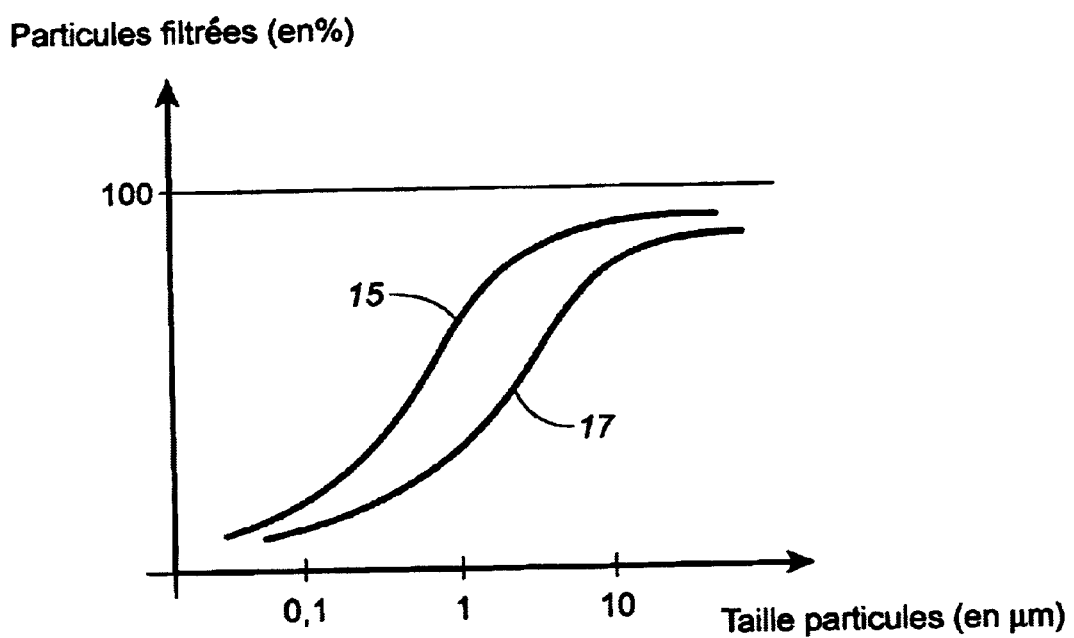
FIG. 3 is a graphical illustration representing the percentage of particles filtered as a function of their size in the case of examples of materials used in the device according to the invention.

In a manner likewise common to these forms of embodiment, filtering member 5, 5A is constituted by a sheet of filtering medium. As already indicated, said filtering medium has a filtering power equal to or greater than that of the porous material used, as more especially illustrated in FIG. 3, from which it can be seen that percentage 15 of particles filtered by the filtering medium is higher than that, 17, of particles filtered by the porous panel, with this applying to all grain sizes.

We claim:

1. An apparatus for diffusing a stream of air within a passenger compartment of motor vehicle comprising:

air supplying means for diffusing air into the passenger compartment;

a porous panel positioned over at least a portion of said air supplying means such that at least one part of the diffused air passes through said porous panel, said porous panel being a portion of a dashboard or a door panel or a roof of the passenger compartment, said porous panel allowing the diffused air from said air supplying means to flow freely simultaneously in all spatial directions; and a filtering means being interposed between said air supplying means and said porous panel, said filtering means having a filtering power no less than a filtering power of said porous panel, said filtering means for retaining all particles present in the air from said air supplying means prior to passing through said porous panel, said porous panel having a grid having a forward portion covered by a porous material, said filtering means comprising a filtering member mounted on said porous panel entirely over a rear portion of said grid, said filtering member being removably mounted to said grid of said porous panel.

2. The apparatus of claim 1, said grid and said porous material and said filtering member being connected together in an assembly, said assembly being removably mounted by complementary means on a fixed support, said complementary means for fixing said support to said grid.

3. The apparatus of claim 1, said fixed support defining a wall, said air supplying means comprising a ventilation conduit emerging through said wall, said ventilation conduit and said assembly defining an enclosure suitable for distributing the stream of air passing through said assembly.

4. An apparatus for diffusing a stream of air within a passenger compartment of motor vehicle comprising:

air supplying means for diffusing air into the passenger compartment;

a porous panel positioned over at least a portion of said air supplying means such that at least one part of the diffused air passes through said porous panel, said porous panel being a portion of a dashboard or a door panel or a roof of the passenger compartment, said porous panel allowing the diffused air from said air supplying means to flow freely simultaneously in all spatial directions; and a filtering means being interposed between said air supplying means and said porous panel, said porous panel comprising a grid having a forward portion covered by a porous material, said porous panel being removably mounted on a fixed support integral with the dashboard or the door panel or the roof, said porous panel further comprising removable complementary means for fixing said fixed support to said grid, said filtering means being removably mounted on said fixed support for allowing said filtering means to be replaced independently from the porous panel.

5. The apparatus of claim 4, said fixed support defining a wall, said air supplying means comprising a ventilation conduit emerging through said wall, said ventilation conduit and said porous panel defining an enclosure suitable for distributing the air passing through said porous material.

6. An apparatus for diffusing a stream of air within a passenger compartment of motor vehicle comprising:

air supplying means for diffusing air into the passenger compartment;

a porous panel positioned over at least a portion of said air supplying means such that at least one part of the diffused air passes through said porous panel, said porous panel being a portion of a dashboard or a door panel or a roof of the passenger compartment, said porous panel allowing the diffused air from said air supplying means to flow freely simultaneously in all spatial directions; and a filtering means being interposed between said air supplying means and said porous panel, said filtering means comprising a filtering member having a surface area greater than a surface area of said porous panel.

7. The apparatus of claim 6, said filtering member being a sheet having concertina-type folds.

8. The apparatus of claim 6, said filtering member being a sheet of filtering medium.

* * * * *